(12) United States Patent
Huang et al.

(10) Patent No.: US 8,154,318 B2
(45) Date of Patent: Apr. 10, 2012

(54) SIGNAL TRANSCEIVER APPARATUS AND SYSTEM

(75) Inventors: Hong-Yi Huang, Taipei (TW); Ruei-lun Pu, Taipei County (TW); Yuan-Hua Chu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 630 days.

(21) Appl. No.: 12/394,046

(22) Filed: Feb. 27, 2009

(65) Prior Publication Data
US 2010/0150213 A1    Jun. 17, 2010

(30) Foreign Application Priority Data
Dec. 17, 2008    (TW) ................................ 97149284 A

(51) Int. Cl.
*H03K 19/003* (2006.01)
(52) U.S. Cl. ............................................ 326/30; 326/27
(58) Field of Classification Search .............. 326/26–28, 326/30
See application file for complete search history.

(56) References Cited

U.S. PATENT DOCUMENTS

| | | | | |
|---|---|---|---|---|
| 6,157,206 A | * | 12/2000 | Taylor et al. ..................... | 326/30 |
| 6,586,964 B1 | * | 7/2003 | Kent et al. ........................ | 326/30 |
| 7,330,075 B2 | * | 2/2008 | Chiang .......................... | 330/259 |

OTHER PUBLICATIONS

Authored by Jackson, et al., article titled "A CMOS mixed signal simultaneous bidirectional signaling I/O",adopted from Circuits and Systems, 1998. Proceedings. 1998 Midwest Symposium on, pp. 37-40.
Authored by Sim, et al., article titled "A 1-Gb/s bidirectional I/O buffer using the current-mode scheme, "IEEE Journal Solid-State Circuits, vol. 34, No. 4, pp. 529-535, Apr. 1999.
Authored by Yeung, et al., article titled "A 2.4Gb/s/pin simultaneous bidirectional parallel link with per-pin skew compensation" IEEE Journal Solid-State Circuits, vol. 35, No. 11, pp. 1619-1628, Nov. 2000.
Authored by Kim, et al., article titled "A 4-GB/s/pin current mode 4-level simultaneous bidirectional I/O with current mismatch calibration, " in Proc. IEEE International Symposium on Circuits and Systems, 2006, pp. 1007-1010.

* cited by examiner

*Primary Examiner* — James H Cho
(74) *Attorney, Agent, or Firm* — Jianq Chyun IP Office

(57) ABSTRACT

A signal transceiver apparatus suitable for a wired signal transceiver system includes a differential signal transmitter, an impendence matching control module and a signal receiver. The signal transmitter has an output terminal which is connected to a transceiver wire. The signal transmitter includes a first impendence tuner and is used to receive a control signal so as to tune impendence of the first impendence tuner according to the control signal. Moreover, the impendence matching control module generates the control signal according to a compare signal and a lock signal. Besides, the signal receiver generates the lock signal and the compare signal according to a compare result between a current flowing through the first impendence tuner and a reference current.

20 Claims, 10 Drawing Sheets

SIGNAL TRANSCEIVER APPARATUS AND SYSTEM

CROSS-REFERENCE TO RELATED APPLICATION

This application claims the priority benefit of Taiwan application serial no. 97149284, filed on Dec. 17, 2008. The entirety of the above-mentioned patent application is hereby incorporated by reference herein and made a part of specification.

BACKGROUND OF THE INVENTION

1. Field of the Invention

The present invention relates to a signal transceiver apparatus and system, and particularly to a wired signal transceiver apparatus and system.

2. Description of Related Art

In recent years, due to advances in technology of semiconductor fabrication, manufacturing electronic products that are light, thin, small and having powerful functions has become a main issue in product designs of the modern electronic products. Regarding requirements in such aspects, engineers often use technologies that dispose a great number of circuits on a single chip and methods of so-called system on chip (SOC) to cope.

However, no matter using what sort of the above technologies, problems of impedance mismatch of signal transmission between different functional circuits are inevitably faced. Please refer to the following FIG. 1, which is a schematic diagram showing a conventional signal transceiver system 100. A signal transceiver system 100 includes two signal transceiver apparatuses 110 and 120, and the signal transceiver apparatuses 110 and 120 respectively belong to different chips. In the signal transceiver apparatus 110, a ratio of current values transmitted by current sources I1, I2 and I3 is 1:0.5:0.25; similarly, a ratio of current values transmitted by current sources I4, I5 and I6 is 1:0.5:0.25. Diodes D1, D2, D3 and D4 are used to ensure that flowing directions of the currents are unidirectional, and transistors M1, M2, M3 and M4 function at a linear region, playing roles of voltage-controlled resistors being controlled by a voltage VR. Data signals to be transmitted are respectively transmitted to input ends IN1 and IN2 of the signal transceiver apparatuses 110 and 120. Switches SW1 and SW2 are respectively controlled by inverse signals of the input ends IN1 and IN2.

The signal transceiver apparatuses 110 and 120 tune currents flowing through the transistors M1, M2, M3 and M4 by on or off of transistors M5 and M6 used as switches in cooperation with on or off of the switches SW1 and SW2, thereby generating different voltages. Comparators CMP1 and CMP2 are further used to compare the above voltages, and received data signals are respectively generated at output ends O1 and O2.

This kind of signal transceiver system 100 uses relations between each of the resistors (including the voltage-controlled resistors formed by the transistors M1, M2, M3 and M4 and impedance of a wire L) in the system to complete a transceiver action, so that the voltage VR used to control the voltage-controlled resistors may be appropriately tuned. Such a tuning mechanism requires a resistor externally connected to an exterior of the chip for completion, thereby intangibly increasing areas and cost of the circuit. Moreover, the signal transceiver system 100 is a unidirectional transceiver device, thereby being more sensitive towards interference by noise, and transceiving qualities of the data signals also need to be improved.

SUMMARY OF THE INVENTION

The present invention provides a bidirectional differential signal transceiver apparatus which has an ability of automatically tuning impedance matching.

The present invention provides a wired signal transceiver system which has the ability of automatically tuning the impedance matching for data transceiving.

The present invention provides a bidirectional differential signal transceiver apparatus which is suitable for a wired signal transmission system and includes a signal transmitter, an impedance matching control module and a current differential signal receiver. The signal transmitter has an output end, and the output end thereof is connected to a transceiver wire. The signal transmitter includes a first impedance tuner. The first impedance tuner is serially connected to the output end and is used to receive a control signal to tune impedance of the first impedance tuner. The impedance matching control module is coupled to the first impedance tuner and is used to generate the control signal according to a lock signal and a compare signal. The signal receiver is coupled to the signal transmitter and generates the lock signal and the compare signal according to comparison of a current flowing through the first impedance tuner and a reference current.

The present invention provides a wired signal transceiver system which includes a plurality of signal transceiver apparatuses. The signal transceiver apparatuses are connected to each other through a plurality of transceiver wires, and each of the signal transceiver apparatuses includes the signal transmitter, the impedance matching control module and the current differential signal receiver. Each of the signal transmitters has the output end, and the output end thereof is connected to the transceiver wire. The signal transmitter includes the first impedance tuner. The first impedance tuner is serially connected to the output end and is used to receive the control signal to tune the impedance of the first impedance tuner. The impedance matching control module is coupled to the first impedance tuner and is used to generate the control signal according to the lock signal and the compare signal. The signal receiver is coupled to the signal transmitter and generates the lock signal and the compare signal according to the comparison of the current flowing through the first impedance tuner and the reference current.

Since the present invention adopts current modes to tune impedance matching, it may be applied to using various sorts of wires having different impedance to transceive signals. In other words, when the present invention is applied to transceive the signal in the chip, a problem of not easily controlling the impedance accurately in the wire is overcome. Moreover, the present invention provides a method of signal transception of a differential signal, effectively lowering effects by a noise and increasing a common mode rejection ratio (CMRR). In addition, since the present invention performs impedance matching according to the current on the transceiver wire, a large voltage swing is not required in the signal transceived, thereby effectively saving power consumption.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The following provides a plurality of embodiments of a signal transceiver apparatus of the present invention for illustration, and figures are accompanied in hope that persons having ordinary skills in the art have a better understanding and are capable of implementation.

Figure 1:
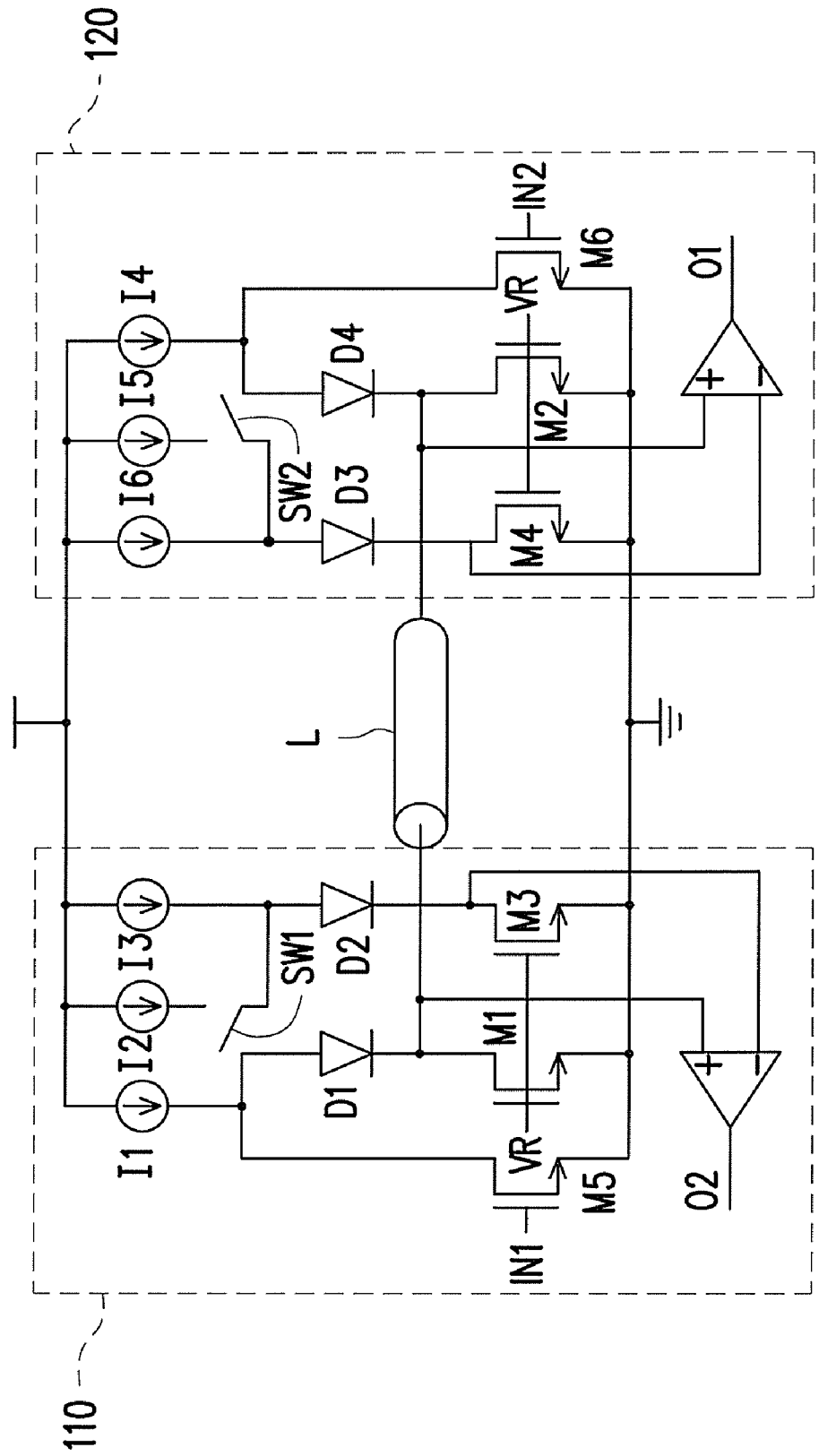
FIG. 1 is a schematic diagram showing a conventional signal transceiver system 100.
Figure 2:
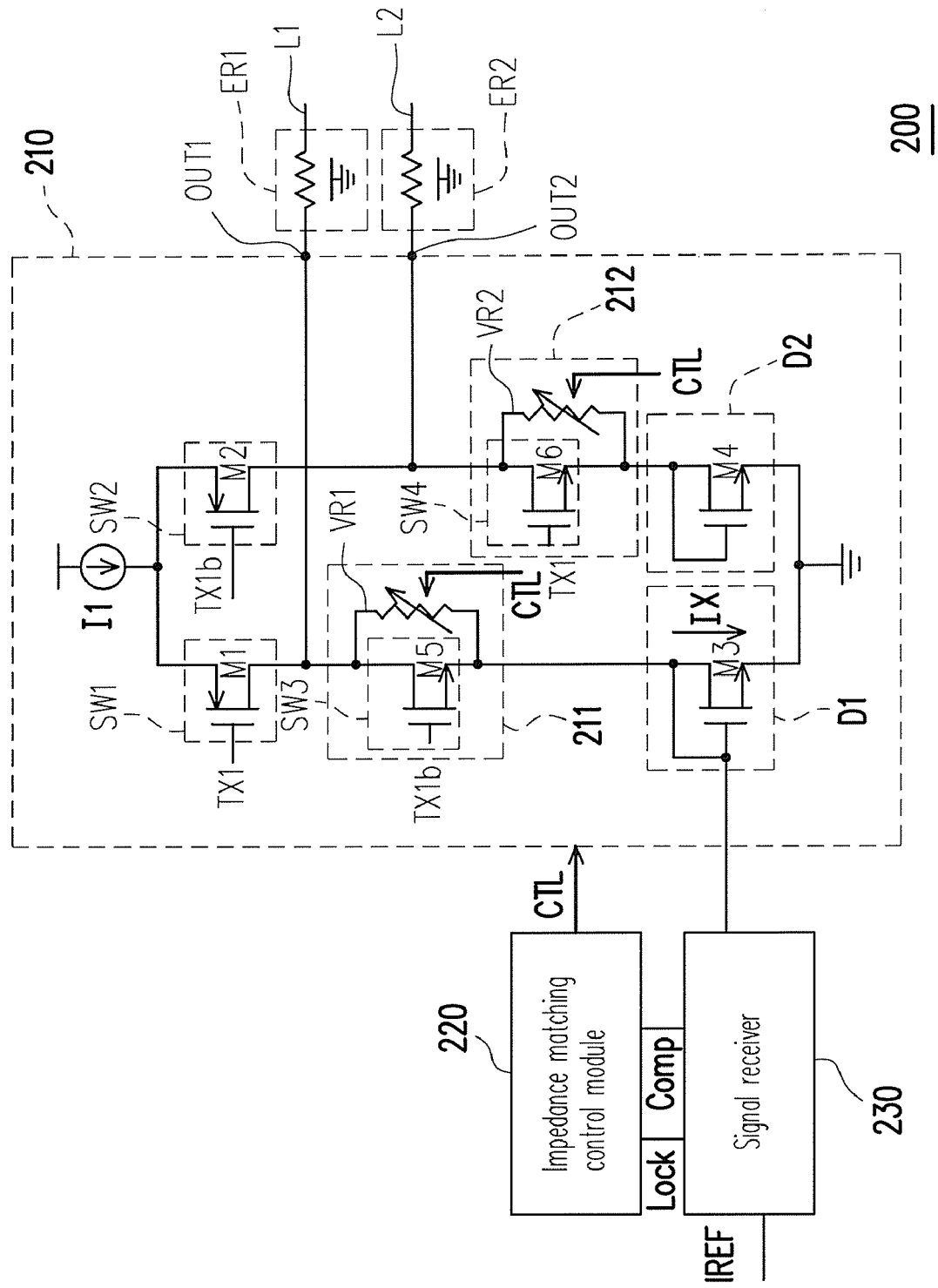
FIG. 2 is a schematic diagram showing a signal transceiver apparatus 200 according to an embodiment of the present invention.

First referring to FIG. 2, which is a schematic diagram showing a signal transceiver apparatus according to an embodiment of the present invention. A signal transceiver apparatus 200 includes a signal transmitter 210, an impedance matching control module 220 and a signal receiver 230. According to the present embodiment, the signal transmitter 210 includes an output end OUT1 and an inverse output end OUT2. The output end OUT1 and the inverse output end OUT2 are respectively connected to transceiver wires L1 and L2. The transceiver wire L1 has equivalent impedance ER1 and the transceiver wire L2 has an equivalent impedance ER2. Moreover, the signal transmitter 210 includes impedance tuners 211 and 212. The impedance tuner 211 is serially connected between the output end OUT1 and a diode D1 formed by a transistor M3. Equally, the impedance tuner 212 is serially connected between the inverse output end OUT2 and a diode D2 formed by a transistor M4. Here, a gate of the transistor M3 is coupled to a first source/drain thereof, and a second source/drain thereof is coupled to a first voltage. According to the present embodiment, the first voltage is a system ground voltage GND. Equally, a gate of the transistor M4 is coupled to a first source/drain thereof, and a second source/drain thereof is coupled to the system ground voltage GND.

Additionally, the signal transmitter 210 further includes a current source I1 and current switches SW1 and SW2 serially connected to the current source. According to the present embodiment, the current switches SW1 and SW2 are respectively formed by transistors M1 and M2. A gate of the transistor M1 receives a data signal TX1 to be transmitted by the signal transmitter 210, and a gate of the transistor M2 receives a inverse of the data signal TX1, TX1$b$. In other words, the current switches SW1 and SW2 are respectively controlled by the data signal TX1 and the inverse of the data signal TX1, TX1$b$. When the current switch SW1 is on (enabled), the current switch SW2 is off (disabled), and when the current switch SW2 is on (enabled), the current switch SW1 is off (disabled).

The impedance tuner 211 includes an impedance tuning switch SW3 and a variable resistor module VR1. Similarly, the impedance tuner 212 includes an impedance tuning switch SW4 and a variable resistor module VR2. The impedance tuning switches SW3 and SW4 are respectively formed by transistors M5 and M6, a gate of the transistor M5 receives the inverse of the data signal TX1, TX1$b$, and a gate of the transistor M6 receives the data signal TX1. Since the transistor M5 according to the present embodiment is an N-type transistor and the transistor M1 is a P-type transistor, actions of on and off of the current switch SW1 and of the impedance tuning switch SW3 are the same (actions of on and off of the current switch SW2 and of the impedance tuning switch SW4 are also the same). In addition, the variable resistor modules VR1 and VR2 are equally controlled by a control signal CTL to tune impedance thereof, so as to achieve impedance matching of the signal transceiver apparatus 200.

Still referring to FIG. 2, the signal receiver 230 is coupled to the gate of the transistor M3, so as to receive a current IX flowing through the impedance tuner 211. The signal receiver 230 also receives the reference current IREF and obtains a lock signal Lock and a compare signal Comp by comparing the current IX and the reference current IREF. Here it should be noted that the signal receiver 230 may also be coupled to the gate of the transistor M4 to receive a current flowing through the impedance tuner 212 to generate the lock signal Lock and the compare signal Comp. A method of the signal receiver 230 being coupled to the transistor M3, referring to FIG. 2, is only an implementation and does not limit the scope of the present invention.

The impedance matching control module 220 is coupled to the signal receiver 230 and receives the lock signal Lock and the compare signal Comp generated by the signal receiver 230. According to the embodiment illustrated in FIG. 2, the impedance matching control module 220 generates the control signal CTL by judging a magnitude relation between the current IX and the reference current IREF according to the above compare signal Comp, thereby tuning the impedance of the impedance tuner 211. The lock signal Lock is used to judge whether an impedance tuning action has been completed (the impedance matching has been achieved), so as to turn off (lock) the impedance tuning action of the impedance tuner 211.

Figure 3A:
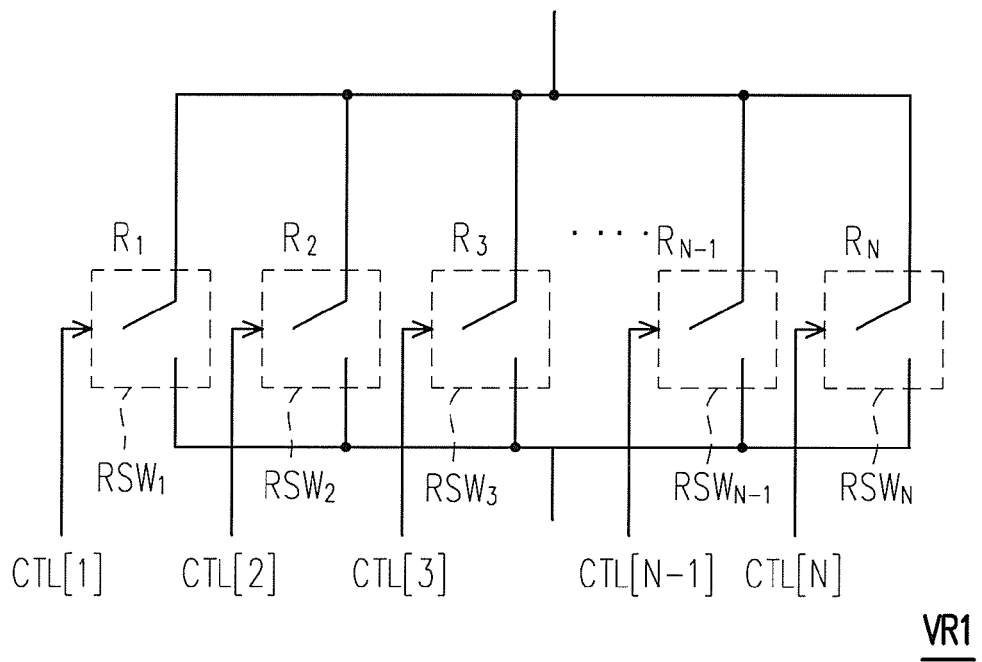
FIG. 3A is a schematic diagram showing an implementation of a variable resistor module VR1 according to an embodiment of the present invention.

Next referring to FIG. 3A, which is a schematic diagram showing an implementation of a variable resistor module VR1 according to an embodiment of the present invention. The variable resistor module VR1 includes N switches $RSW_1$ to $RSW_N$ and N resistors $R_1$ to $R_N$. The switches $RSW_1$ to $RSW_N$ and the resistors $R_1$ to $R_N$ are sequentially and serially connected to each other. The switches $RSW_1$ to $RSW_N$ are respectively controlled by each of bits CTL[1] to CTL[N] of the control signal. It can be clearly known from the illustration in FIG. 3A that when all the switches $RSW_1$ to $RSW_N$ according to the implementation of the variable resistor module VR1 illustrated in FIG. 3A are turned on, the variable resistor module VR1 has a smallest resistor value (which is a resistor value of the parallelly connected resistors $R_1$ to $R_N$). When only one of all the switches $RSW_1$ to $RSW_N$ is turned on, the variable resistor module VR1 has a largest resistor value.

Figure 3B:
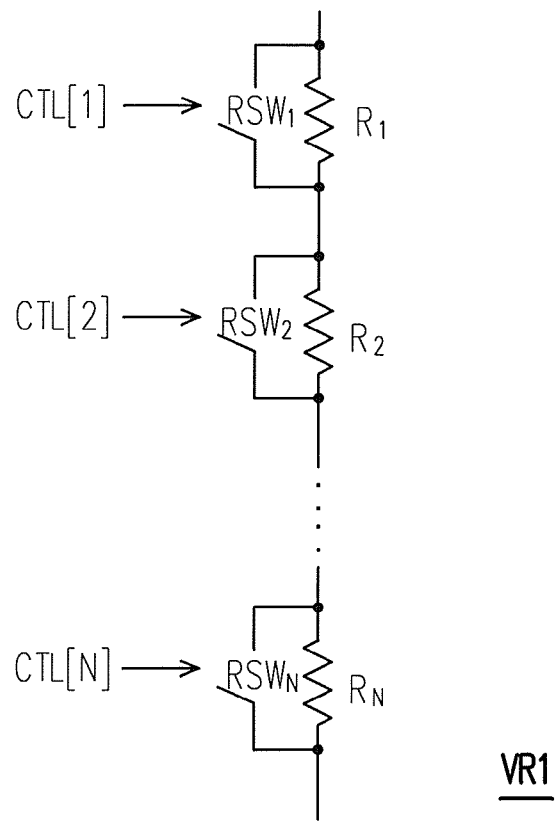
FIG. 3B is a schematic diagram showing another implementation of a variable resistor module VR1 according to an embodiment of the present invention.

It should be noted that the variable resistor module VR1 may also be implemented using implementation of the variable resistor module VR1 according to an embodiment illustrated in FIG. 3B. What is different from the implementation illustrated in FIG. 3A, the implementation illustrated in FIG. 3B uses pairs of the switches $RSW_1$ to $RSW_N$ parallelly connected to each other for implementation, and the switches $RSW_1$ to $RSW_N$ respectively have resistors equivalent to the resistors $R_1$ to $R_N$. When all the switches $RSW_1$ to $RSW_N$ are turned off, the variable resistor module VR1 has the largest resistor value, and when all the switches $RSW_1$ to $RSW_N$ are turned on, the variable resistor module VR1 has the smallest resistor value.

In other words, in a device for tuning resistors wherein persons having ordinary skills in the art may easily implement, anything that implements functions of the variable resistor module VR1 according to the embodiments of the present invention belong within the scope of the present invention.

Figure 4:
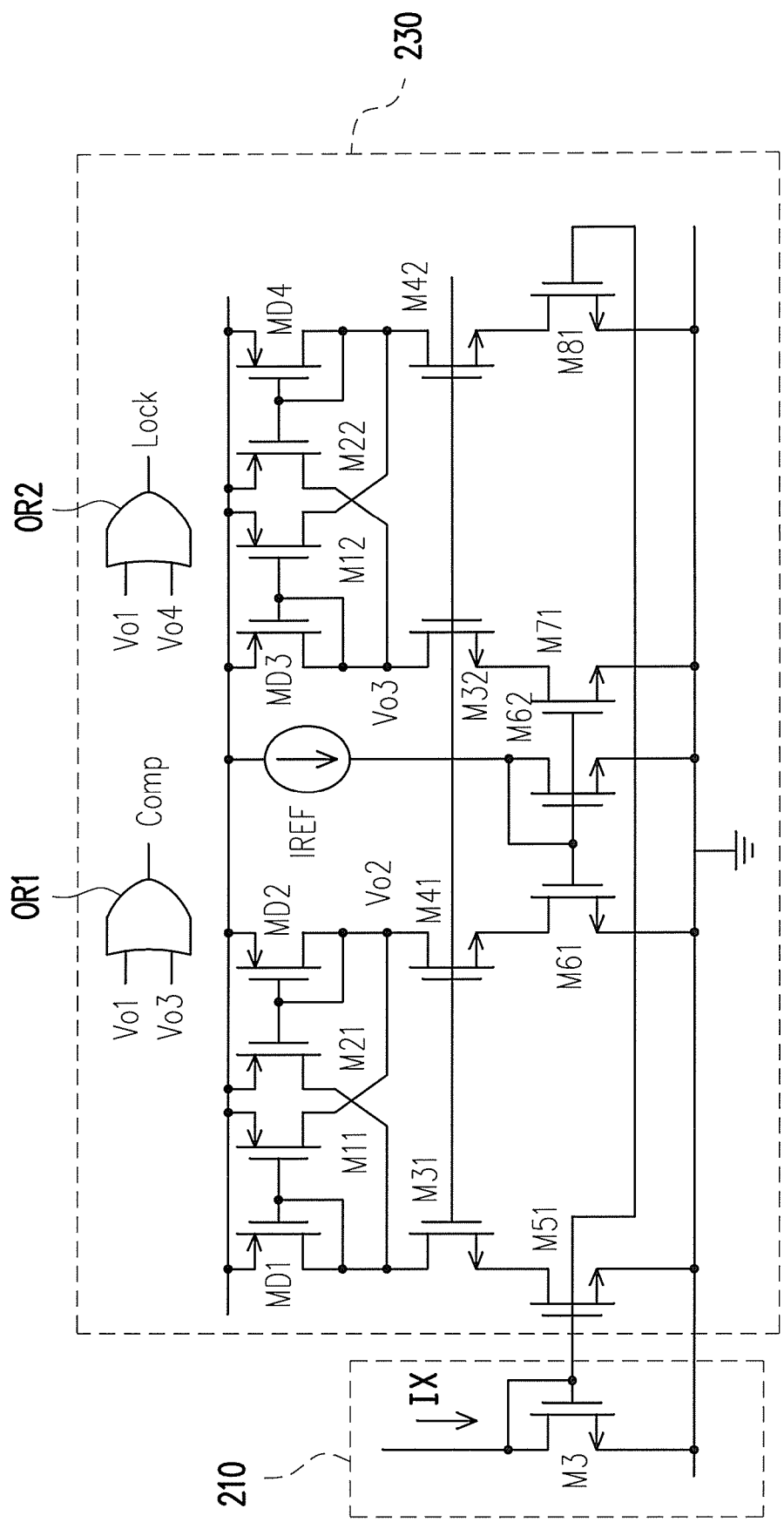
FIG. 4 is a schematic diagram showing an implementation of a signal receiver 230 according to an embodiment of the present invention.

Next referring to FIG. 4, which is a schematic diagram showing an implementation of the signal receiver 230 according to an embodiment of the present invention. The signal receiver 230 illustrated in FIG. 4 is a dual threshold comparator. The signal receiver 230 uses a transistor M51 and a transistor M81 with the transistor M3 in the signal transmitter 210 to form a current mirror, so as to receive the current IX. Moreover, transistors M62, M61 and M71 form a current mirror, and reflect the reference current IREF. Transistors M11, M21, M31, M41, MD1 and MD2 form a comparator in cooperation with the transistors M51 and M61, and generate complementary outputs Vo1 and Vo2; transistors M12, M22, M32, M42, MD3 and MD4 form another comparator in cooperation with the transistors M71 and M81, and generate complementary outputs Vo3 and Vo4. The transistors MD1 to MD4 are coupled in a diode form. A difference between the above two comparators is that a ratio of widths of channels of the transistor M51 and of the transistor M61 is 1:K1, wherein K1 is a rational number larger than 1. A ratio of widths of channels of the transistor M71 and of the transistor M81 is 1:K2, wherein K2 is also a rational number larger than 1 Therefore, the comparator formed by the transistors M11, M21, M31 and M42 in cooperation with the transistors M51 and M61 compares magnitudes of the current IX times K1 and of the reference current IREF. Another comparator formed by the same transistors M12, M22, M32 and M42 in cooperation with the transistors M71 and M81 compares magnitudes of the current IX times K2 and of the reference current IREF.

Figure 5:
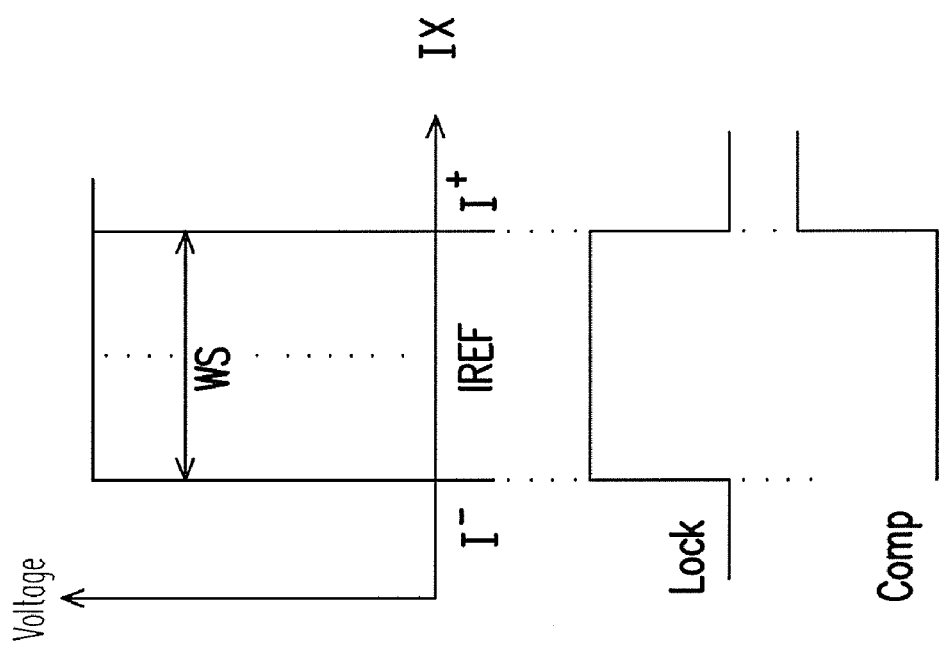
FIG. 5 is a schematic diagram showing that a width of a window WS is determined by K1 and K2 in cooperation with a reference current IREF.

It can be known from the above illustration that the above K1 and K2 are used to determine two thresholds of the dual threshold comparator. Here please refer to a wave pattern schematic diagram of the signal receiver 230 illustrated in FIG. 5. FIG. 5 is a schematic diagram showing that a width of a window WS is determined by K1 and K2 in cooperation with the reference current IREF. The lower threshold $I^-=IREF/K2$, and the higher threshold $I^+=IREF \times K1$. The width of the window $WS=I^+-I^-$.

Relating to the lock signal Lock and the compare signal Comp, the compare signal Comp is generated from the output Vo1 and the output Vo3 using an OR gate OR1 performing an OR operation, and the lock signal Lock is generated from the output Vo1 and the output Vo4 using an OR gate OR2 performing another OR operation. In other words, when the current IX is smaller than the low threshold $I^-$, the compare signal Comp is cleared to a logical low potential "0", and when the current IX rises to be higher than the upper threshold $I^+$, the compare signal Comp is set to a logical high level "1". Relating to the lock signal Lock, when the current IX is located in the width of the window WS, the lock signal Lock is set to a logical level "1", and when the current IX is located outside the width of the window WS, the lock signal Lock is cleared to become a logical level "0".

Figure 6A:
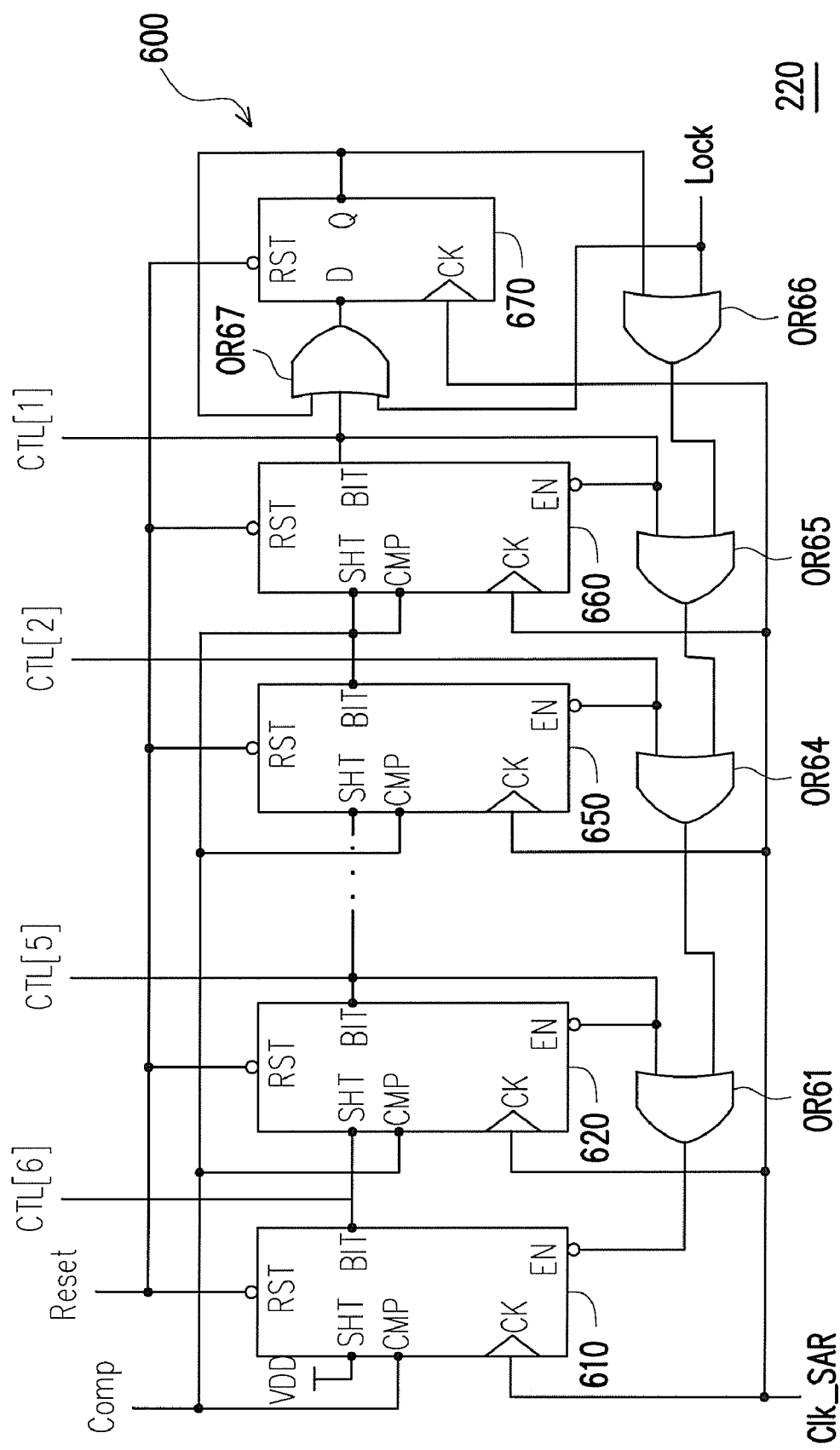
FIG. 6A is a schematic diagram showing an implementation of an impedance matching control module 220 according to an embodiment of the present invention.

Next referring to FIG. 6A, which is a schematic diagram showing an implementation of the impedance matching control module 220 according to an embodiment of the present invention. The impedance matching control module 220 is formed by a successive approximation counter 600. The successive approximation counter 600 receives a counting clock Clk_SAR, the compare signal Comp and the lock signal Lock. The successive approximation counter 600 performs counting according to the counting clock Clk_SAR and stops counting when the lock signal Lock is enabled (when it is the logical level "1"). The successive approximation counter 600 includes N multiple input shift register units 610 to 660 (in an implementation illustrated in FIG. 6A, N=6), N−1 OR gates OR61 to OR 65 and OR gates OR66 and OR67.

Each of the multiple input shift register units 610 to 660 has a reset input end RST, a shift input end SHT, a compare input end CMP, a clock input end CK, an enabling input end EN and a bit output end Q. The multiple input shift register units 610 to 660 and the compare input end CMP receives the compare signal Comp together, and the reset input end mutually receives a reset signal Reset. The clock input ends CK of the multiple input shift register units 610 to 660 mutually receive the counting clock Clk_SAR, and the output end Q of the multiple input shift register units 610 to 660 respectively outputs the control signals CTL[6] to CTL[1]. The multiple input shift register units 610 to 660 are parallelly connected to each other, meaning that the i bit output end Q of the multiple input shift register unit is coupled to the i+1 shift input end SHT of the multiple input shift register units, wherein i is a positive integral, and i+1≦N. The first multiple input shift register unit 660 is coupled to the second voltage, and as illustrated in FIG. 6A, the second voltage is a system voltage VDD.

The OR gates OR61 to OR65 are respectively serially connected between each of the multiple input shift register units 610 to 660, wherein an input end of the i OR gate is coupled to the bit output end of the i−1 multiple input shift register unit, and another input end of the i OR gate is coupled to the output end of the i−1 OR gate. The OR gate OR67 has three input ends. The first input end thereof is coupled to the bit output end Q of the multiple input shift register unit 660, the second input end thereof receives the lock signal Lock and the third input end thereof is coupled to an input end of the OR gate OR66. Another input end of the OR gate OR66 receives the lock signal Lock, and the output end thereof is coupled to the OR gate OR65. A flip-flop 670 has a data end D, the output end Q, the reset end RST and the clock end CK. The clock end CK thereof receives the counting clock Clk_SAR, the reset end RST thereof receives the reset signal Reset, the data end thereof is coupled to the output end of the OR gate OR67, and the output end Q thereof is coupled to the third input end of the OR gate OR67 and another input end of the OR gate OR66.

Figure 6B:
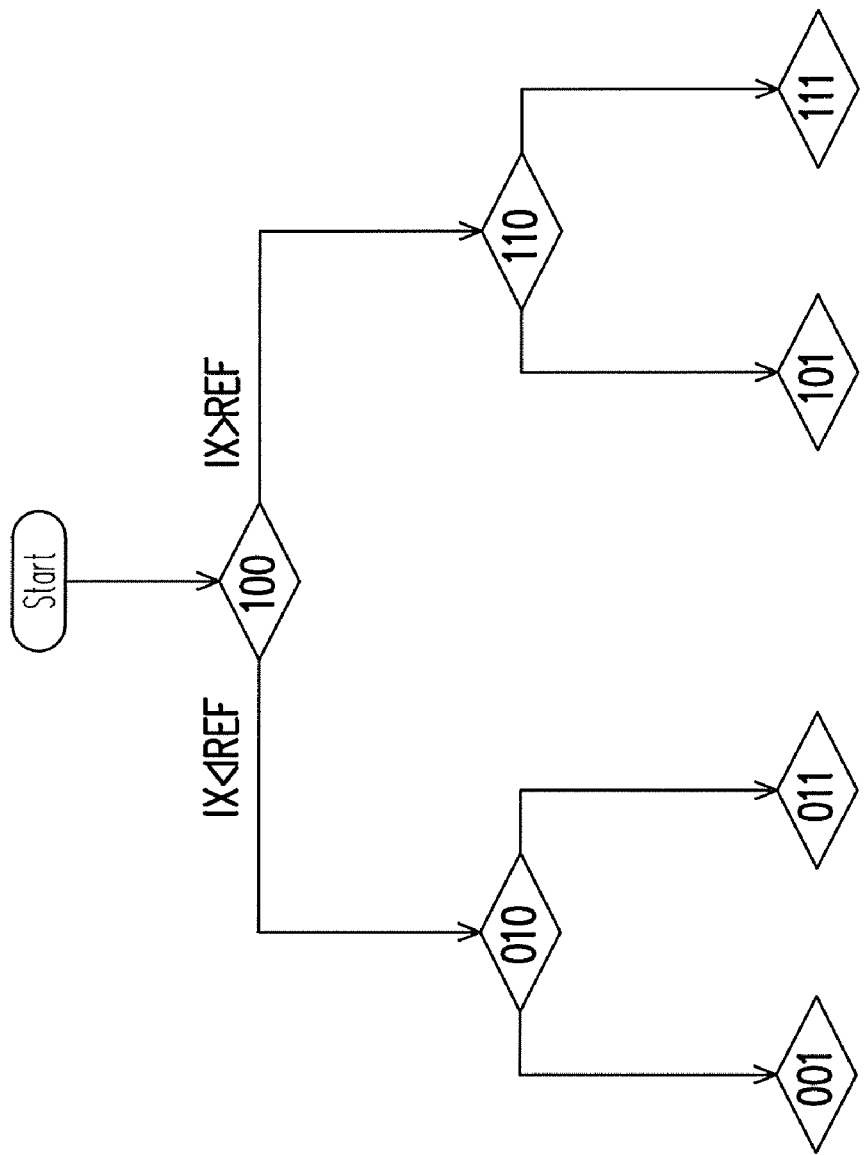
FIG. 6B is a schematic diagram showing a binary search algorithm.

The successive approximation counter 600 is used to realize a so-called binary search algorithm. Referring to FIG. 6B, which is a schematic diagram showing the binary search algorithm. Here a 3 bit control signal being output is used as an example. When initiating, the control bit is set to "1 0 0". If the current IX flowing through the impedance tuner is smaller than the reference current IREF at this moment, it means that the impedance of the impedance tuner must be tuned down to increase the current IX flowing through the impedance tuner. Therefore, the control bit is tuned to "0 1 0" in advance. If the current IX flowing through the impedance tuner is still smaller than the reference current IREF after performing tuning in advance, the control bit is tuned again to "0 1 1" or "0 0 1". On the other hand, when the control bit is set to "1 0 0" during initiating, if the current IX flowing through the impedance tuner is larger than the reference current IREF, it means that the impedance of the impedance tuner must be tuned up to decrease the current IX flowing through the impedance tuner. Therefore, the control bit is tuned to "1 1 0" in advance. If the current IX flowing through the impedance tuner is still larger than the reference current IREF after performing tuning in advance, the control bit is tuned again to "1 0 1" or "1 1 1".

Referring again to FIG. 6A, the successive approximation counter 600 is basically a multiple input shift register. When signals received by enabling ends of each of the multiple input shift register units 610 to 660 and the signals output by the bit output ends thereof are all logical levels "0", the successive approximation counter 600 performs an action of shifting towards right (shift mode); when the signals received by the enabling ends of each of the multiple input shift register units 610 to 660 are all logical levels "1", the successive approximation counter 600 memorizes the signals output by the bit output ends thereof (memory mode). In addition, when the signals received by the enabling ends of each of the multiple input shift register units 610 to 660 are the logical levels "0" and the signals output by the bit output ends are all the logical levels "1", the successive approximation counter 600 reads a value stored therein to be used as the signals output by the bit output ends thereof (data read mode).

Figure 7:
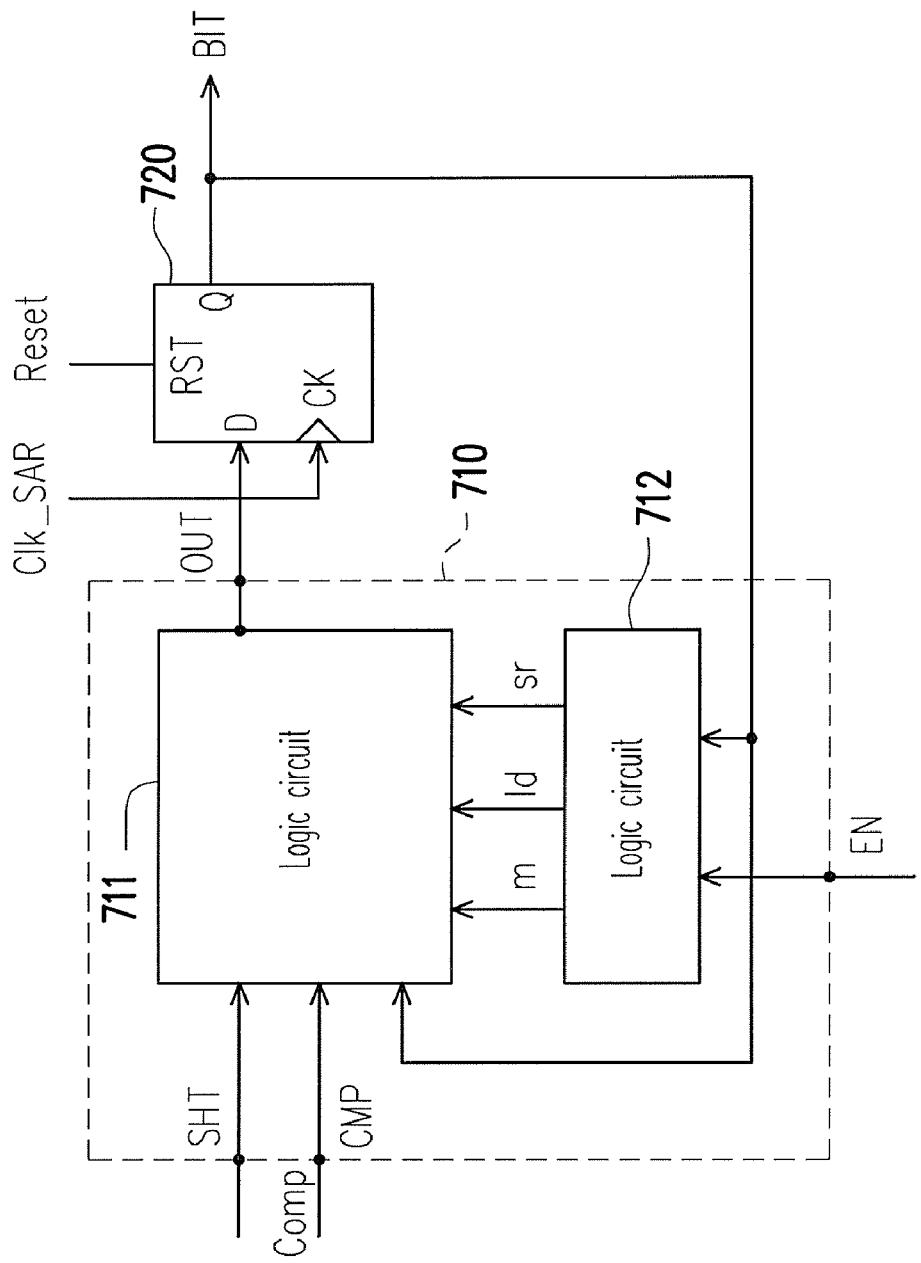
FIG. 7 is a schematic diagram showing an implementation of a multiple input shift register according to an embodiment of the present invention.

The following refers to FIG. 7, which is a schematic diagram showing an implementation of the multiple input shift register unit according to an embodiment of the present invention. The multiple input shift register unit 610 includes a mode selector 710 and a flip-flop 720. The mode selector 710 includes two logic circuits 711 and 712 and is respectively coupled to the shift input end SHT, the compare input end CMP and the enabling input end EN of the multiple input shift register unit 610. In addition, the mode selector 710 has the output end OUT which is coupled to the data end D of the flip-flop 720. The output end Q of the flip-flop is coupled to the bit output end BIT of the multiple input shift register unit 610, the reset end RST thereof receives the reset signal Reset, and the clock end thereof receives the counting clock Clk_SAR.

The logic circuit 712 of the mode selector 710 generates a memory signal m, a data read mode signal Id or a shift mode signal sr according to the signals output from the output end Q of the flip-flop 720 and the signals received by the enabling input end EN of the multiple input shift register unit 610, so as to set the logic circuit 711 to perform the memory mode, the data read mode or the shift mode of the successive approximation counter 600 illustrated in the previous paragraphs.

Figure 8:
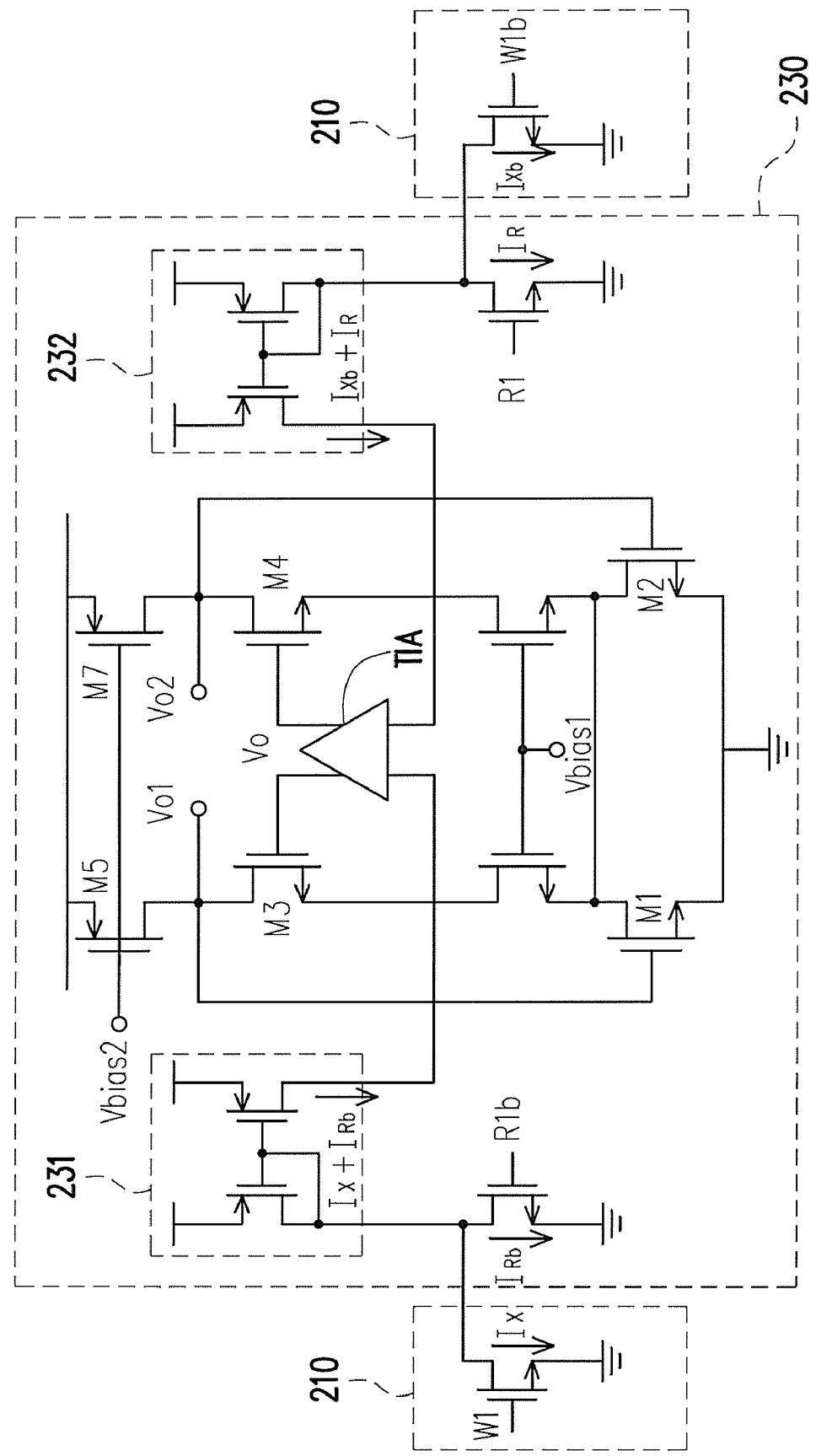
FIG. 8 is a schematic diagram showing an implementation of a signal receiver 230 according to an embodiment of the present invention.

Next referring to FIG. 8, which is a schematic diagram showing an implementation of the signal receiver 230 according to an embodiment of the present invention. The signal receiver 230 mainly uses two current mirrors 231 and 232 to respectively connect to the two transistors M3 and M4 according to the implementation of the signal transmitter 210 in the above illustration, so as to receive currents Ix and Ixb.

The currents Ix, Ixb, $I_{Rb}$ and $I_R$ are respectively generated according to voltages W1, W1b, R1b and R1. The current mirror 231 combines the currents Ix and $I_{Rb}$, and a result of a current Ix+$I_{Rb}$ is transmitted to a trans-impedance amplifier TIA with a gain-boosting amplifier. Similarly, the current mirror 232 adds the currents Ixb and $I_R$, and a result of a current Ixb+$I_R$ is transmitted to the trans-impedance amplifier TIA. The trans-impedance amplifier TIA generates an output voltage Vo=$A_{TIA}$[(Ix+$I_{Rb}$)−(Ixb+$I_R$)], wherein $A_{TIA}$ is a gain by the trans-impedance amplifier TIA.

Input impedance of the trans-impedance amplifier TIA is lowered by a negative feedback illustrated in FIG. 8, so that the signal receiver 230 is more suitable for receiving current signals. The input impedance $R_{in}$ is approximate to $1/(gm_{M3} \cdot A_G)$. $A_G$ is a gain generated by the trans-impedance amplifier TIA working under an efficiency of 40 db. $gm_{M3}$ is a small signal gain of the transistor M3. Moreover, output impedance $R_{out}$ of the signal receiver 230 may be calculated as shown in the following equation:

$$R_{out} = (A_G \cdot gm_{M3} \cdot ro_{M3} \cdot ro_{M2}) \| ro_{M5}$$

$ro_{M3}$, $ro_{M2}$ and $ro_{M5}$ are respectively output impedance of the transistors M3, M2 and M5, and "∥" represents a resistor value of a parallel connection.

The transistors M5 and M7 may function under lower operating voltages since there are no transistors parallelly connected thereto. Through the above mathematical equation deduced above, it may be known that the gain by the trans-impedance amplifier TIA can directly affect a value of the output impedance $R_{out}$. In addition, the transistors M1 and M2 function in the linear region as resistors of voltage control under a common mode feedback. Here, an equivalent resistor $R_{eq}$ of the transistors M1 and M2 is shown in the following equation:

$$R_{eq,M1-m2} \approx \frac{1}{\mu_n C_{ox} \left[\frac{W}{L}\right]_{1,2} (V_{o1} + V_{o2} - 2V_t)}$$

$\mu_n$ is an electron drifting rate, $C_{ox}$ is capacitance of each unit area of gate oxide layers of the transistors M1 and M2, $V_t$ is a threshold voltage of the transistors M1 and M2. In addition, Vbias1 and Vbias2 illustrated in FIG. 8 are respectively biased voltages.

Figure 9:
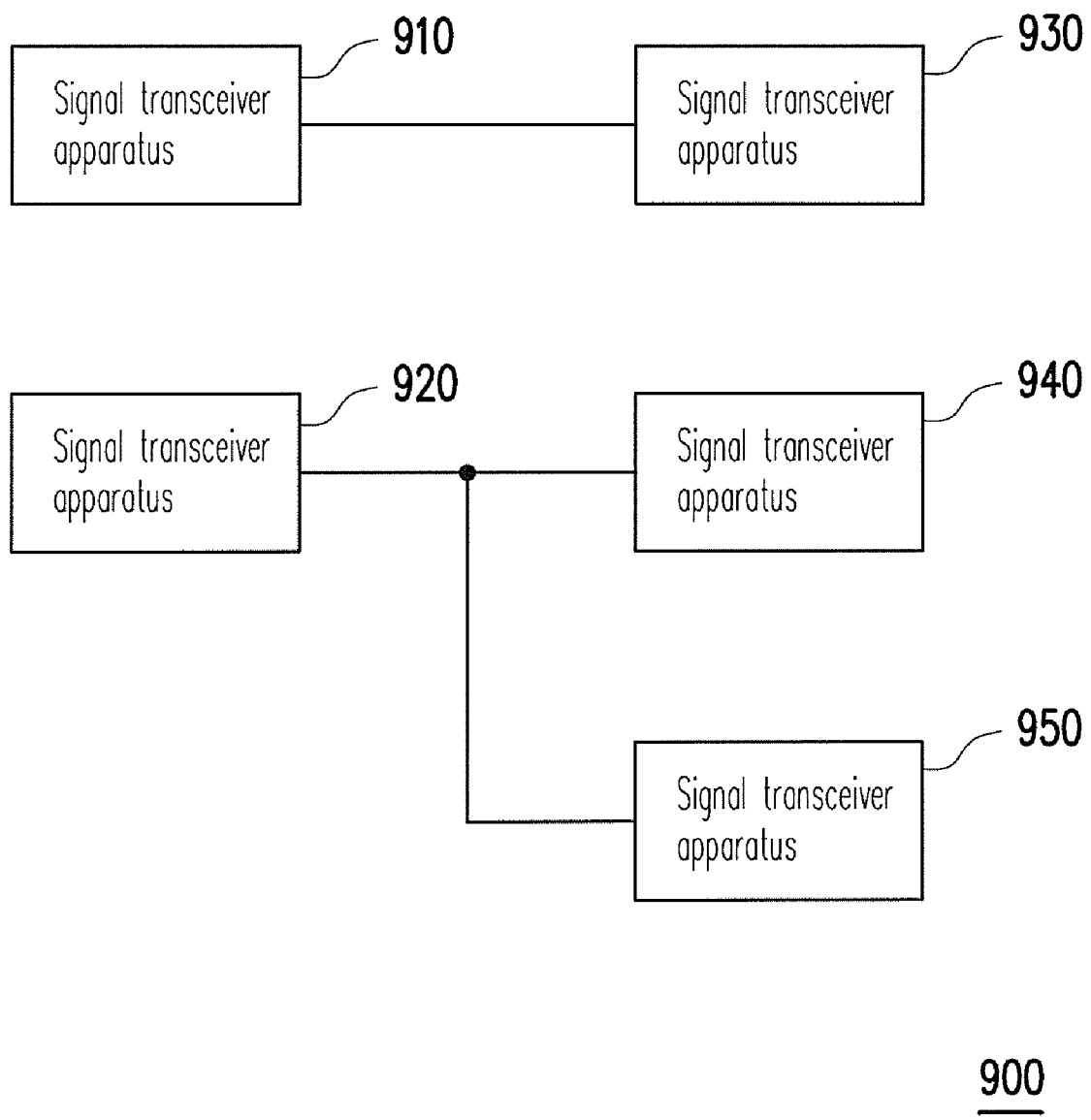
FIG. 9 is a schematic diagram showing an implementation of a signal transceiver system 900 according to an embodiment of the present invention.

In the following, please refer to FIG. 9, which is a schematic diagram showing an implementation of a signal transceiver system 900 according to an embodiment of the present invention. A signal transceiver system 900 includes a plurality of signal transceiver apparatuses 910 to 950, the signal transceiver apparatus 910 is connected to the signal transceiver apparatus 930 through a transceiver wire L3, and the signal transceiver apparatus 920 is connected to the signal transceiver apparatuses 940 and 950 through a transceiver wire L4. In addition, implementation of each of the signal transceiver apparatuses 910 to 950 is illustrated in detail in the above embodiments, so that repeated description is omitted here.

In summary, since the present invention adopts current modes to tune impedance matching, it may be applied to various sorts of wires having different impedance to transceive signals, thereby being able to cope with large ranges of impedance of the transceiver wires. In other words, the present invention not only applies to transception of externally connected transceiver wires, but also overcomes the problems of the impedance in the wires being not easily tuned accurately when being applied to transceive signals in the chip. Moreover, the present invention provides a method of signal transceiving of the differential signal, thereby effectively lowering effects by the noise, increasing a common mode rejection ratio (CMRR), and effectively enhancing quality of data transception. In addition, since the present invention performs impedance matching according to the currents on the transceiver wires, a large voltage swing is not required in the signals transceived, thereby effectively saving power consumption.

Although the present invention has been described with reference to the above embodiments, application of the present invention is not limited to these embodiments. It will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A signal transceiver apparatus suitable for a wired signal transceiver system, comprising:
    a signal transmitter having an output end, the output end being connected to a transceiver wire, wherein the signal transmitter comprises:
        a first impedance tuner serially connected to the output end and receives a control signal to tune impedance of the first impedance tuner; and
    an impedance matching control module coupled to the first impedance tuner and used to generate the control signal according to a lock signal and a compare signal; and
    a signal receiver coupled to the signal transmitter and generates the lock signal and the compare signal according to comparison of a current flowing through the first impedance tuner and a reference current.

2. The signal transceiver apparatus of claim 1, wherein the signal transmitter further comprises:
    a current source which transmits a current;
    a first current switch coupled to the current source and an end of the first impedance tuner, the first current switch disables or enables the current flowing through the output end according to a data signal to be transmitted by the signal transmitter; and
    a first transistor having a gate, a first source/drain and a second source/drain, wherein the gate thereof is coupled to the first source/drain and the signal receiver, the first source/drain thereof is coupled to another end of the first impedance tuner, and the second source/drain thereof is coupled to a first voltage.

3. The signal transceiver apparatus of claim 2, wherein the first impedance tuner comprises:
    a first impedance tuning switch electrically connected between the first current switch and the first transistor, wherein the first impedance tuning switch is controlled by inverse of the data signal, and the first impedance tuning switch comprises a first variable resistor module used to tune the impedance of the first impedance tuner.

4. The signal transceiver apparatus of claim 3, wherein the first variable resistor module comprises:
    a plurality of switches, an end of each of the switches being mutually coupled to an end of the first current switch, and the switches are turned on or turned off by the control signal; and
    a plurality of resistors, an end of each of the resistors being mutually coupled to another end of the first current switch, and another end of each of the resistors being respectively coupled to another end of the corresponding switches.

5. The signal transceiver apparatus of claim 1, wherein the signal receiver comprises:
    a dual threshold comparator comparing the reference current and the current flowing through the first impedance tuner and received by the dual threshold comparator so as to generate the lock signal and the compare signal.

6. The signal transceiver apparatus of claim 2, wherein the signal transmitter further comprises a inverse output end, and the inverse output end is connected to a inverse transceiver wire, the signal transmitter further comprising:
    a second impedance tuner serially connected to the inverse output end and receiving the control signal to tune impedance of the second impedance tuner.

7. The signal transceiver apparatus of claim 6, wherein the signal transmitter further comprises:
    a second current switch coupled to the current source and an end of the second impedance tuner, disabling or enabling the current flowing through the inverse output end according to a inverse of the data signal to be transmitted by the signal transmitter; and
    a second transistor having a gate, a first source/drain and second source/drain, wherein the gate thereof is coupled to the first source/drain, the first source/drain thereof is coupled to another end of the second impedance tuner, and the second source/drain thereof is coupled to the first voltage.

8. The signal transceiver apparatus of claim 6, wherein the second impedance tuner comprises:
    a second impedance tuning switch electrically connected between the first current switch and the second transistor, wherein the second impedance tuning switch is controlled by the data signal, and the second impedance tuning switch comprises a second variable resistor module used to tune the impedance of the second impedance tuner.

9. The signal transceiver apparatus of claim 8, wherein the second variable resistor module comprises:
    a plurality of switches, an end of each of the switches being mutually coupled to an end of the first current switch, and the switches are turned on or turned off by the control signal; and
    a plurality of resistors, an end of each of the resistors being mutually coupled to another end of the first current switch, and another end of each of the resistors being respectively coupled to another end of the corresponding switches.

10. The signal transceiver apparatus of claim 1, wherein the impedance matching control module comprises:
    a successive approximation counter receiving a counting clock, the compare signal and the lock signal, wherein the successive approximation counter performs counting according to the counting clock and stops counting when the lock signal is enabled.

11. A wired signal transceiver system, comprising:
    a plurality of signal transceiver apparatuses, the signal transceiver apparatuses being connected to each other through a plurality of transceiver wires, each of the signal transceiver apparatuses comprising:
        a signal transmitter comprising an output end, the output end being connected to one of the transceiver wires, wherein the signal transmitter comprises:
            a first impedance tuner serially connected to the output end and receives a control signal to tune impedance of the first impedance tuner; and an impedance matching control module coupled to the first impedance tuner and used to generate the control signal according to a lock signal and a compare signal; and a signal receiver coupled to the signal transmitter and generates the lock signal and the compare signal according to comparison of a current flowing through the first impedance tuner and a reference current.

12. The signal transceiver system of claim 11, wherein the signal transmitter further comprises:

a current source which transmits a current;

a first current switch coupled to the current source and an end of the first impedance tuner, disabling or enabling the current flowing through the output end according to a data signal to be transmitted by the signal transmitter; and a first transistor comprising a gate, a first source/drain and a second source/drain, wherein the gate thereof is coupled to the first source/drain and the signal receiver, the first source/drain thereof is coupled to another end of the first impedance tuner, and the second source/drain thereof is coupled to a first voltage.

13. The signal transceiver system of claim 11, wherein the first impedance tuner comprises:

a first impedance tuning switch electrically connected between the first current switch and the first transistor, wherein the first impedance tuning switch is controlled by a inverse of the data signal, and the first impedance tuning switch includes a first variable resistor module used to tune resistance of the first impedance tuning switch.

14. The signal transceiver system of claim 13, wherein the first variable resistor module comprises:

a plurality of switches, an end of each of the switches being mutually coupled to an end of the first current switch, and the switches are turned on or turned off by the control signal; and a plurality of resistors, an end of each of the resistors being mutually coupled to another end of the first current switch, and another end of each of the resistors being respectively coupled to another end of the corresponding switches.

15. The signal transceiver system of claim 11, wherein the signal receiver comprises:

a dual threshold comparator comparing the reference current and the current flowing through the first impedance tuner and received by the dual threshold comparator so as to generate the lock signal and the compare signal.

16. The signal transceiver system of claim 11, wherein the signal transmitter further comprises a inverse output end, and the inverse output end is connected to a inverse transceiver wire, the signal transmitter further comprising:

a second impedance tuner serially connected to the inverse output end and receiving the control signal to tune impedance of the second impedance tuner.

17. The signal transceiver system of claim 16, wherein the signal transmitter further comprises:

a second current switch coupled to the current source and an end of the second impedance tuner, disabling or enabling the current flowing through the inverse output end according to a inverse of the data signal to be transmitted by the signal transmitter; and a second transistor having a gate, a first source/drain and second source/drain, wherein the gate thereof is coupled to the first source/drain, the first source/drain thereof is coupled to another end of the second impedance tuner, and the second source/drain thereof is coupled to the first voltage.

18. The signal transceiver system of claim 16, wherein the second impedance tuner comprises:

a second impedance tuning switch electrically connected between the first current switch and the second transistor, wherein the second impedance tuning switch is controlled by the data signal, and the second impedance tuning switch comprises a second variable resistor module used to tune resistance of the second impedance tuner.

19. The signal transceiver system of claim 18, wherein the second variable resistor module comprises:

a plurality of switches, an end of each of the switches being mutually coupled to an end of the first current switch, and the switches are turned on or turned off by the control signal; and a plurality of resistors, an end of each of the resistors being mutually coupled to another end of the first current switch, and another end of each of the resistors being respectively coupled to another end of the corresponding switches.

20. The signal transceiver system of claim 11, wherein the impedance matching control module comprises:

a successive approximation counter receiving a counting clock, the compare signal and the lock signal, wherein the successive approximation counter performs counting according to the counting clock and stops counting when the lock signal is enabled.

* * * * *